(12) United States Patent
Ressel et al.

(10) Patent No.: US 7,234,486 B2
(45) Date of Patent: Jun. 26, 2007

(54) PRESSURE LIMITING VALVE FOR FUEL INJECTION DEVICES

(75) Inventors: Horst Ressel, Winnenden (DE); Wolfgang Scheibe, Ludwigsburg-Poppenweiler (DE); Michael Lippisch, Bautzen (DE); Rene Teuber, Neuhausen a.d.f. (DE)

(73) Assignee: L'Orange GmbH, Stuttgart (DE)

( * ) Notice: Subject to any disclaimer, the term of this patent is extended or adjusted under 35 U.S.C. 154(b) by 377 days.

(21) Appl. No.: 10/473,153

(22) PCT Filed: Mar. 26, 2002

(86) PCT No.: PCT/EP02/03376

§ 371 (c)(1),
(2), (4) Date: Mar. 8, 2004

(87) PCT Pub. No.: WO02/077446

PCT Pub. Date: Oct. 3, 2002

(65) Prior Publication Data

US 2004/0134539 A1    Jul. 15, 2004

(30) Foreign Application Priority Data

Mar. 27, 2001   (DE)   ................................ 101 15 162

(51) Int. Cl.
*F16K 17/04*   (2006.01)
*F16K 21/10*   (2006.01)
*F02M 37/00*   (2006.01)

(52) U.S. Cl. ..................... 137/469; 137/513; 137/514.7
(58) Field of Classification Search ................. 137/469, 137/513, 514.5, 514.7, 538; 123/506, 514
See application file for complete search history.

(56) References Cited

U.S. PATENT DOCUMENTS

| | | | | |
|---|---|---|---|---|
| 4,603,710 | A * | 8/1986 | Tiefenthaler | 137/514.7 |
| 5,170,818 | A * | 12/1992 | Hatzikazakis | 137/469 |
| 5,215,114 | A * | 6/1993 | Breyer | 137/469 |
| 5,560,343 | A * | 10/1996 | Werkmann et al. | 123/514 |
| 5,603,348 | A * | 2/1997 | Geringer | 137/514.7 |
| 6,068,022 | A | 5/2000 | Schultz et al. | 137/538 |
| 6,125,822 | A * | 10/2000 | Janik et al. | 137/469 |
| 6,446,613 | B1 * | 9/2002 | Djordjevic | 123/514 |

FOREIGN PATENT DOCUMENTS

| | | |
|---|---|---|
| DE | 196 12 412 | 10/1997 |
| DE | 198 22 671 | 11/1999 |
| DE | 198 52 409 | 5/2000 |
| EP | 0887 544 | 4/1998 |

\* cited by examiner

*Primary Examiner*—John Rivell
(74) *Attorney, Agent, or Firm*—Crowell & Moring LLP

(57) ABSTRACT

A pressure limiting valve is provided which has a valve body assigned on the high-pressure side to a valve seat and an operating piston combined with the valve body to form a unit. The valve body and the operating piston are jointly spring-loaded and bound a pressure space which can be opened as a function of pressure with respect to a connection cross-section open in the return flow by way of the operating piston moving in a sliding guide.

15 Claims, 1 Drawing Sheet

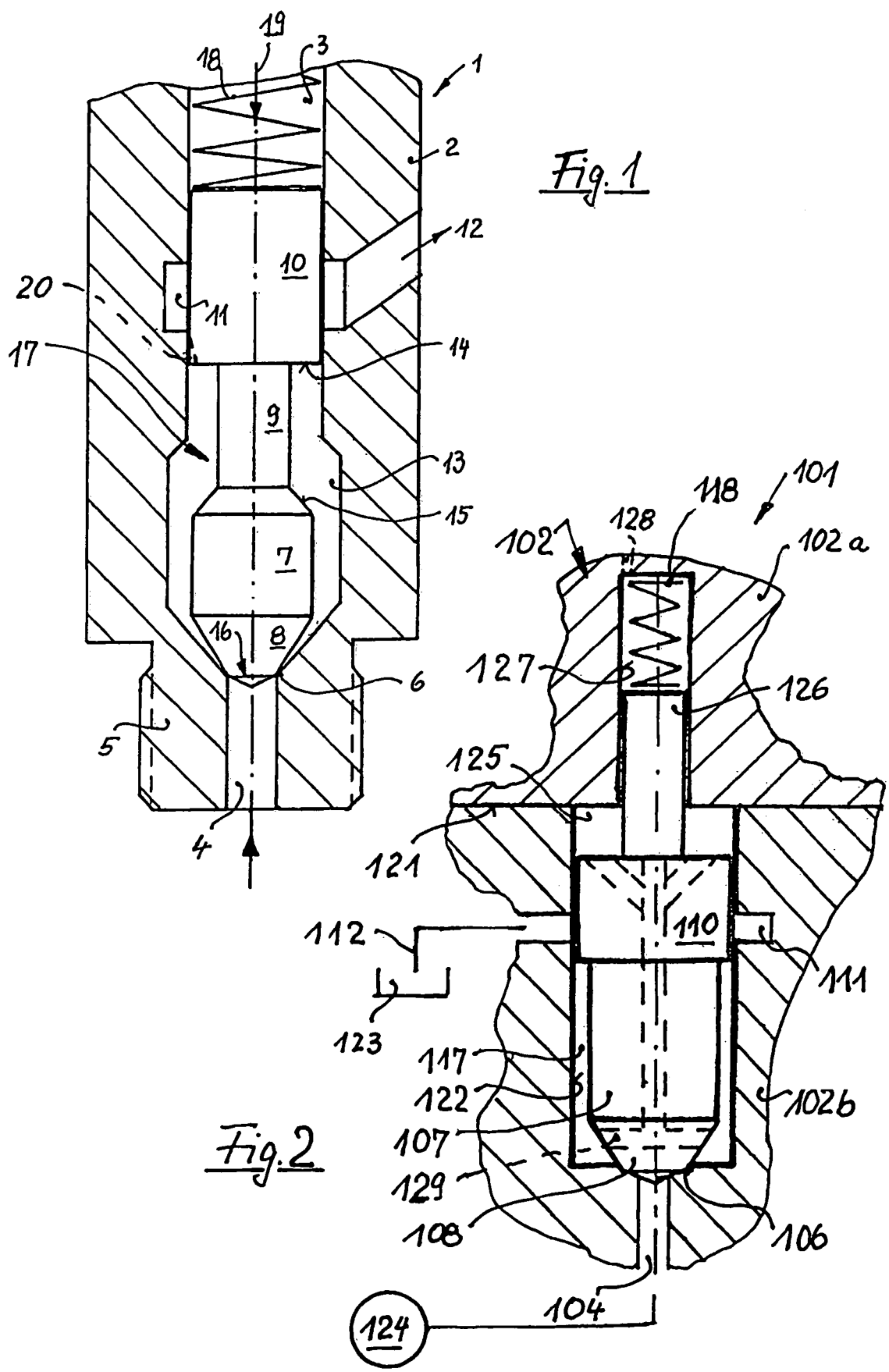

PRESSURE LIMITING VALVE FOR FUEL INJECTION DEVICES

BACKGROUND AND SUMMARY OF THE INVENTION

The invention relates to a pressure limiting valve for fuel injection devices, particularly for fuel injection devices of internal-combustion engines constructed as common rail systems, comprising a housing with an inlet-side high-pressure connection, a return flow connection and a throttling flow connection situated between them, which has a valve seat on the inlet side and in which, in a spring-loaded manner in the direction of the closing position and displaceably as a function of the pressure in the opening direction, a valve body interacting with the valve seat as well as a piston assigned to the sealing limit arranged behind the valve seat in the direction of the return flow bound a pressure space, the piston, while sealingly moving in a sliding guide being arranged in a stable manner with respect to the coaxial valve body, and, relative to the piston and the valve body as a unit, when the pressure space is opened with respect to the high-pressure connection, the effective surfaces of the unit pressurized against the spring force being larger than when the pressure space is blocked off with respect to the high-pressure connection.

Pressure limiting valves of the above-mentioned type are known from German Patent Document DE 198 22 671 A1 in the embodiment according to FIG. 3. For a throttling flow connection, throttling elements in the form of fixed throttles are provided in the transition from the pressure space to the return flow connection, which fixed throttles are arranged in the piston and lead out to the rearward space of the piston to which the restoring spring is assigned which acts in the direction of the closing position of the valve body in the valve seat, the pressure-dependent adjustment of the piston in the opposite direction to the spring loading being limited with respect to the stop. This type of a further development in connection with common rail systems has the purpose of avoiding the buildup of an unacceptably high storage pressure in the event of a failure of the pressure control of the system and a resulting system overload. Because of the limitation of the stop, it is already difficult to reliably avoid storage pressures situated in the overload range by way of the pressure limiting valve. Furthermore, dynamic pressure courses, in particular, are critical during which the valve body, as a function of the pressure, oscillates between an upper stop limitation and a lower closing position. Relative to a given delivery and consumption quantity, thus relative to approximately stationary conditions, it seems that in this manner, by way of the fixed throttles arranged in the piston in the outflow path from the pressure space—in the case of a corresponding, but definitely critical coordination—somewhat constant flow conditions can be reached, but in the practical operation, there is still the risk of a sawtooth-type opening and closing of the pressure limiting valve with corresponding consequences with respect to its wear and to the operation of the internal-combustion engine which reacts to correspondingly fluctuating injection pressures by a correspondingly unsteady running.

In an embodiment according to FIG. 4 of German Patent Document 198 22 671 A1, it is attempted to counteract this situation such that the piston is constructed as a hollow piston and that another piston-type blocking element is arranged in the hollow space of the piston, which blocking element, in its blocking position, blocks off the throttled overflow path from the pressure space to the hollow space, and which itself is connected by way of throttle openings with the return flow connection, in which case the piston and the blocking member guided into its hollow space are jointly spring-loaded relative to their blocking position. Although by means of such a series mounting of blocking elements and throttles which are assigned to them and through which the flow can take place in the direction of the return flow, the entire pressure range to be covered between the upper limit pressure—response of the pressure limiting valve—and the lower limit pressure—closing of the pressure limiting valve—can be divided into smaller pressure ranges given by the pressure drop over the respective throttling path and thereby, relative to the steadying of the outflow conditions, can also be improved, this takes place at the expense of a relatively complicated overall construction and a very complex coordination.

Furthermore, from German Patent Document DE 198 52 409 A1, a pressure limiting valve is known which has a piston which is spring-loaded in the closing direction, moves in a bore as a sliding guide and is formed by a thin bearing needle, whose displacement path in the spring-loaded closing direction is limited with the respect to the stop, and which is guided in a radially sealing manner along an axial sealing path between a face-side stop and a connection cross-section formed by an annulus. The opening of the input-side high-pressure connection takes place as soon as the piston in the form of the slim valve needle leaves the axial sealing path as a function of the pressure, against the spring support. When the flow connection is opened up as well as when it is closed, the pressurized effective surfaces of the piston are the same, and a damping space is assigned to the piston on the spring side for the purpose of damping, which damping space is connected with the return flow and a damper piston connected with the valve needle is situated in it. Since the pressurized effective surfaces of the piston are the same because of its construction as a valve needle, which maintains the same diameter along its length, the piston oscillates corresponding to the pressure fluctuations and blocks the flow connection starting from an opening position as soon as the respective holding pressure falls under the opening pressure. There is therefore no tolerance field around the opening pressure as the reference pressure, and the flow connection is or remains closed as soon as, within the scope of pressure fluctuations, which are counteracted by the damping, the opening pressure is not reached or there is a falling below the opening pressure.

The pressure limiting valves addressed above with respect to the state of the art are therefore critical in view of high-pressure-side pressure fluctuations and make a design more difficult particularly in that the upper limit pressure dangerous with respect to damage is clearly above a working pressure which represents a still acceptable limit value for all operating ranges of the internal-combustion engine and which is to be ensured by way of the pressure limiting valve.

It is therefore an object of the invention to design a pressure limiting valve of the initially mentioned type, while its construction is simple, in such a manner that, in the case of a critical upper limit value, after the opening, a pressure reduction to a desired value can be achieved, particularly to a compromise value which is acceptable for all operating ranges of the internal-combustion engine, as long as, relative to this compromise value, an excess volume is present on the high pressure side.

According to the invention, a pressure limiting valve is provided for fuel injection devices, of internal-combustion engines constructed as common-rail systems, comprising a housing with an inlet-side high-pressure connection, a return flow connection and a throttling flow connection situated between them, which has a valve seat on the inlet side and in which, in a spring-loaded manner in the direction of the closing position and displaceably as a function of the pressure in the opening direction, a valve body interacting with the valve seat as well as a piston assigned to the sealing limit arranged behind the valve seat in the direction of the return flow bound a pressure space, the piston, while sealingly moving in a sliding guide being arranged in a stable manner with respect to the coaxial valve body, and, relative to the piston and the valve body as a unit, when the pressure space is opened with respect to the high-pressure connection, the effective surfaces of the unit pressurized against the spring force being larger than when the pressure space is blocked off with respect to the high-pressure connection, wherein the sliding guide has a connection cross-section which is overlapped by the piston and wherein the piston in a closing position of the valve body, covers the connection cross-section in the closing direction in an overlapping manner. This pressure limiting valve is distinguished by a very simple construction because the piston and the valve body form a unit which can easily be produced and because, in conjunction with the integration of the connection cross-section for the return flow into the sliding guide for the piston, as a result of this sliding guide and the piston, by means of tested devices, the corresponding sealing limit can be created also in a simple manner while the connection cross-section is variable. Functionally, the piston forms an operating piston because the admission of pressure, as a result of the pressure existing in the pressure space, causes a displacement against the spring force acting in the closing direction and the pressure in the pressure space is a function of the connection cross-section to the return flow which is opened up by way of the operating piston. Furthermore, because of the piston position which, in the closing position of the valve body, overlaps the connection cross-section in the closing direction, supplementing the different size of the pressurized effective surfaces, without any additional expenditures, the extent of the possible pressure reduction with respect to a critical, still permissible maximum pressure can be influenced just as much as the size of the pressure range, at whose leaving in the downward direction, the pressure limiting valve closes, the valve body therefore reaching its closing position with respect to the valve seat.

In order to avoid, also in the event of extreme pressure rises in the storage system, an overswinging of the unit formed by the piston and the valve body in the opening direction against the spring force, which would result in the risk of an excessively fast and extensive pressure reduction in the pressure space and thus in a bouncing of the valve body against the valve seat, it was found to be expedient to bound the opening path of the above-mentioned unit of the piston and the valve body, and therefore also the compression path of the spring acting upon this unit in the closing direction, by means of a stop.

Within the scope of the invention, it is expedient to produce the unit of the piston and the valve body in one piece, and to assign a corresponding housing bore as a receiving device to this unit, which housing bore merges into an input-side high-pressure connection in the area of the seat of the valve body.

In the opposite direction, it is expedient to design the bore in the area of the valve body in an expanded manner, particularly in an undercut manner, so that favorable flow conditions can build up in the pressure space, for which it is also expedient to further develop the transmission between the valve body and the piston as a shaft with a reduced diameter. The diameters of the mutually opposite face-side ring diameters of the piston and the valve body, which occur in the transition to the shaft, in view of a pressure relief, are of the same size but, on the whole, are selected such that, when the pressure space is opened against the high-pressure side and, corresponding to the pressure drop over the throttling path during the flow through the pressure space in the direction of the return flow, a pressure-dependent adjusting force occurs which acts against the spring force and also compensates the spring hardening occurring with an increasing adjustment of the piston against the spring force.

The surface situated in the transition from the shaft to the piston forms the face-side area of the piston which, when the pressure limiting valve is closed, overlaps the sliding guide and, together with the sliding guide, forms the sealing limit in the transition between the pressure space and the connection cross-section overdriven by the piston to the return flow.

Relative to the dimensions occurring in practice, it should be taken into account that also very small diameters to approximately 2 mm can be used for the valve body, while the diameters for the piston are of a dimension of approximately 4 mm. These result in high manufacturing-related requirements, particularly also in view of the fact that, for coordinating the pressurized effective surfaces, further gradations are necessary.

As a further development of the invention, it was therefore found to be expedient to assign to the unit consisting of the valve body and the piston, on the spring side, a damping space connected with the pressure space, and with respect to its fraction of the pressurized effective surfaces, adapt this damping space by way of the diameter of an axial compensating pin to the requirements. This results in the possibility of changing, particularly for the piston, but also for the valve body, to larger diameters, and of achieving, in the case of a small cross-section of the compensating pin, high closing pressures, so that an excessively long opening of the valve at a maximal stroke, or the freeing of excessively large connection cross-sections is avoided. In the case of such a further development, the spring can constructionally be supported against the pin.

Further details and characteristics of the invention are contained in the claims. In addition, the invention will be explained in the following by means of a pressure limiting valve according to the invention which is illustrated in a schematic sectional view.

BRIEF DESCRIPTION OF THE DRAWINGS

FIG. 1 is a view of the basic construction of a pressure limiting valve according to the invention which may be integrated in a known manner, for example, in common-rail systems; and FIG. 2 is a view of another further development according to the invention of such a pressure limiting valve with another solution for implementing different effective surfaces as well as for the damping.

DETAILED DESCRIPTION OF THE DRAWINGS

In FIG. 1, reference number 1 indicates the only partially shown pressure limiting valve in its entirety, and reference number 2 indicates its housing which, deviating from the illustration, may also be constructed in several parts and in which a central housing bore 3 is provided. The housing bore 3 ends coaxially on the inlet-side high-pressure connection which is formed by a bore 4 which penetrates the connection stub 5 constructed as a screwed stub, by means of which the pressure limiting valve 1 is connected, for example, with the pressure accumulator.

The valve seat 6 is situated in the transition of the bore 4 of the inlet-side high-pressure connection to the housing bore 3, which valve seat 6 interacts with the valve body 7 which, in the embodiment shown, comprises a valve cone 8 assigned to the valve seat 6 and which, in the opposite direction, merges into a shaft 9 whose diameter tapers with respect to the housing bore 3 and which is adjoined by a piston 10 for which the bore 3 forms a sliding guide. The piston 10 overlaps an annulus 11 which expands the housing bore 3 and forms a connection cross-section overdriven by the piston 10 to the return flow 12.

In the embodiment shown, the piston 10 with the shaft 9 having the reduced diameter and the valve body 7 are combined to a one-piece unit. However, this unit may also be designed in a different manner; thus, it may, for example, be constructed.

The valve body 7 is situated inside the housing bore 3 in a bore area 13 whose diameter is expanded. This is not absolutely necessary within the scope of the invention but may be advantageous with respect to favorable flow conditions.

Furthermore, it is expedient within the scope of the invention for ring surface 14 of the mutually opposite face-side ring surfaces 14 and 15 of the piston 10 and of the valve body 7 to be slightly larger than ring surface 15, so that the maximal diameter of the valve body 7 is smaller than the diameter of the housing bore 3 and so that, also independently of the surface ratio of the valve body 7 or of the valve cone 8 to surface 16 overlapping the valve seat 6, in the case of the pressure space 17 which is open to the high-pressure-side connection, an admission of pressure to the unit formed by the piston 10, the shaft 9 and the valve body 7 takes place against the force of the spring 18 which loads the above-mentioned unit in the closing direction (arrow 19).

By designing the surface ratios, it can be ensured that the compression of the spring 18 resulting from the displacement of the valve body 7 in the opening direction against the spring force (arrow 19), and the thereby increasing spring force can be compensated, just like the pressure drop which occurs after the opening of the pressure space 17 against the return flow connection 12.

Thus, by way of the corresponding design of the surfaces with respect to the course of the spring force as well as to a high-pressure-side working pressure which was defined for the emergency operation—failure of the pressure control and/or volume control of the common-rail system—as a compromise value acceptable for all operating ranges of the internal-combustion engine, an operation of the internal-combustion engine is ensured which leads neither to damage to the engine or its aggregates, nor can it be recognized by the passengers, for example, in the operation of a boat, by an irregular running of the internal-combustion engine, as a faulty operation. If a pressure value which corresponds to the compromise pressure defined for the emergency operation is exceeded in the pressure chamber 17, this leads to an enlarged transfer cross-section to the return flow connection 12 and to a corresponding pressure reduction. If there is a falling-below this pressure as pressure defined by the design, the connection cross-section to the return flow 12 is increasingly gradually shut off by way of the piston until a lower limit pressure has been reached and, by way of the force of the spring 18, the pressure limiting valve 1 is closed.

By defining the free connection cross-section to the return flow 12 as a mean opening cross-section which corresponds to the compromise value defined as the design value, a sufficient bandwidth can be defined in which pressure and/or volume fluctuations can be caught. In this case, particularly a larger overlapping between the piston 10 and the sliding guide relative to the closing position of the valve body 7 results in additional clearance, so that, although a reliable closing of the pressure limiting valve 1 is achieved when a corresponding pressure drop occurs in the common-rail system, on the other hand, pressure fluctuations in the system around the compromise value as an adjusting value do not result in a timing behavior of the pressure limiting valve and can be compensated by a corresponding adaptation of the flow-off cross-section to the return flow 12. In view of this result, it may also be expedient to provide in the overlapping area of the piston 10 with respect to the sliding guide cross-sectional areas extending in an opening manner against the return flow 12 in the sliding guide, for example, groove-type recesses 20 which expand in a wedge-shaped manner.

FIG. 2 shows a pressure limiting valve 101 of basically the same construction. However, relative to FIG. 1, reference numbers are used for identical parts which were increased by 100, in which case, in FIG. 2, the housing 102 has a housing top part 102*a* and a housing bottom part 102*b*, and these housing parts 102*a* and 102*b* are connected with one another in a partial plane 121.

In the housing bottom part 102*b*, an axial bore 122 is provided which has a continuously equal diameter and onto which the bore 104 of the inlet-side high-pressure connection leads and in which the unit is situated which is formed by the piston 110 and the valve body 107, the valve body 107 ending in a valve cone 108 which has a sealing effect in the valve seat 106 with respect to the high-pressure connection formed by the bore 104. The piston 110 is again situated in the overlapping area with respect to a housing-side annulus 111 to which the return flow 112 is connected which symbolically leads out to the tank 123. The high-pressure-side supply is symbolized by the pump 124.

The diameter of the valve body 107 is slightly reduced with respect to the piston 110 so that, when the valve body 107 is opened and axially lifted against the force of the spring 118, the remaining ring surface between the piston 110 and the valve body 107 is pressurized by way of the pressure space 117 and, after a corresponding displacement path, the connection to the annulus 111 from the high-pressure-side connection formed by the bore 104 is controlled open, in which case the piston 110, in its position assigned to the closed position of the valve body 107 overlaps the connection cross-section to the annulus 111 to such an extent that the opening-up of the connection cross-section with respect to the lifting of the valve body 107 off the valve seat 106 takes place in a delayed manner, specifically only after the exceeding of a constructively defined overlapping path.

On the rear side with respect to the piston 110, a damping space 125 is provided which is bounded by a section of the bore 122 situated between the piston 110 and the housing top part 102, the damping space 125 being bridged by a compensating pin 126 which is guided in a slidingly sealing manner in a bore 127 of the housing top part 102 and which, on the rear side with respect to the compensating pin 126, is acted upon by way of the spring 118. The spring space is provided with a leakage discharge 128.

The damping space 125 is connected with the pressure space 117 by way of a duct connection 129 which is indicated by a broken line, and the compensating pin 126 may be constructed as a separate component resting on the face-side against the piston 110, or may be combined with the unit formed by the piston 110 and the valve body 107.

As a result of the utilization of the rearward space of the piston 110 as a damping space 125 which is connected with the pressure space 117, the embodiment according to FIG. 2, in comparison to that according to FIG. 1, offers broadened possibilities of defining the pressurized effective surfaces and thus also of designing the spring 118, by way of the damping function, the valve function being additionally improved, as also explained by means of FIG. 1.

The invention claimed is:

1. Pressure limiting valve for fuel injection devices, particularly for fuel injection devices of internal-combustion engines constructed as common-rail systems, comprising a housing with an inlet-side high-pressure connection, a return flow connection and a throttling flow connection situated between them, which has a valve seat on the inlet side and in which, in a spring-loaded manner in the direction of the closing position and displaceably as a function of the pressure in the opening direction, a valve body interacting with the valve seat as well as a piston arranged behind the valve seat in the direction of the return flow bound a pressure space, the piston, while sealingly moving in a sliding guide being arranged in a stable manner with respect to the coaxial valve body, and, relative to the piston and the valve body as a unit, when the pressure space is opened with respect to the high-pressure connection, the effective surfaces of the unit pressurized against the spring force being larger than when the pressure space is blocked off with respect to the high-pressure connection, wherein the sliding guide has a connection cross-section which is overlapped by the piston;

wherein the piston, in a closing position of the valve body, covers the connection cross-section in the closing direction in an overlapping manner;

wherein a damping space connected with the pressure space is assigned on the spring side to the unit of the valve body and the piston; and wherein a compensating pin, which penetrates the damping space and influences the difference between the pressurized effective surfaces, is assigned on the spring side to the unit of the valve body and the piston, and wherein the compensating pin opposite the piston is slidingly in a sealing manner guided in a guide bore which receives the spring.

2. Pressure limiting valve according to claim 1, wherein the flow connection comprises a housing bore which ends on the valve seat and which forms the sliding guide.

3. Pressure limiting valve according to claim 2, wherein the connection between the valve body and the piston is formed by a shaft whose diameter is reduced with respect to the diameter of the sliding guide.

4. Pressure limiting valve according to claim 2, wherein the connection cross-section to the return flow overlapped by the piston is constructed as an annulus expanding the sliding guide.

5. Pressure limiting valve according to claim 1, wherein the connection between the valve body and the piston is formed by a shaft whose diameter is reduced with respect to the diameter of the sliding guide.

6. Pressure limiting valve according to claim 5, wherein the connection cross-section to the return flow overlapped by the piston is constructed as an annulus expanding the sliding guide.

7. Pressure limiting valve according to claim 1, wherein the connection cross-section to the return flow overlapped by the piston is constructed as an annulus expanding the sliding guide.

8. Pressure limiting valve according to claim 1, wherein an adjusting path of the unit comprising the valve body and the piston is bounded with respect to a stop against the spring direction.

9. A pressure limiting valve for fuel injection systems, comprising:

a valve housing with an internal pressure space, a high pressure inlet opening, and a return flow outlet opening, said valve housing forming an annular space opening directly to the return flow outlet opening and a valve seat surrounding the high pressure inlet opening, a piston unit slidably disposed in the valve housing and having a valve body engageable with the valve seat to close the connection of the high pressure inlet opening and the internal pressure space and a piston section which overlaps the annular space to close the connection of the internal pressure space with the return flow outlet opening when the valve body is in a closed position, and a spring engageable with the piston unit to bias the piston unit toward its closed position against fluid pressure acting on the piston at the high pressure inlet opening and in the internal pressure space, wherein the internal pressure space is an annular space around the piston unit intermediate the valve body valve seat engaging portion and the piston section overlapping the annular space when the piston unit is in the closed position, wherein a damping space connected with the internal pressure space is assigned on a spring side to the piston section, and wherein a compensating pin, which penetrates the damping space is assigned on the spring side to the piston section, and wherein the compensating pin opposite the piston section is slidingly in a sealing manner guided in a guide bore which receives the spring.

10. A pressure limiting valve according to claim 9, wherein said internal pressure space is defined in part by a section of the piston unit which has a reduced diameter as compared with the piston unit section which in use selectively overlaps the annular space.

11. A pressure limiting valve according to claim 10, wherein said internal pressure space is defined in part by an enlarged diameter opening in the housing as compared to housing sections bounding the annular spaces.

12. A pressure limiting valve according to claim 9, wherein said internal pressure space is defined in part by an enlarged diameter opening in the housing as compared to housing sections bounding the annular spaces.

13. A pressure limiting valve for fuel injection systems, comprising:

a valve housing with an internal pressure space, a high pressure inlet opening, and a return flow outlet opening, said valve housing forming an annular space opening directly to the return flow outlet opening and a valve seat surrounding the high pressure inlet opening, a piston unit slidably disposed in the valve housing and having a valve body engageable with the valve seat to close the connection of the high pressure inlet opening and the internal pressure space and a piston section which overlaps the annular space to close the connection of the internal pressure space with the return flow outlet opening when the valve body is in a closed position, and a spring engageable with the piston unit to bias the piston unit toward its closed position against fluid pressure acting on the piston at the high pressure inlet opening and in the internal pressure space, wherein the internal pressure space is an annular space around the piston unit intermediate the valve body valve seat engaging portion and the piston section overlapping the annular space when the piston unit is in the closed position, wherein a damping space connected with the internal pressure space is assigned on a spring side to the piston section, wherein a duct connection defined by the piston unit connects the damping space with the internal pressure space and wherein a first orifice of the duct connection opens into the damping space and a second orifice of the duct connection opens into the internal pressure space, and wherein a compensating pin, which penetrates the damping space is assigned on the spring side to the piston section.

14. A pressure limiting valve according to claim 13, wherein the compensating pin opposite the piston section is slidingly in a sealing manner guided in a guide bore which receives the spring.

15. A pressure limiting valve according to claim 13, wherein the spring engages with the compensating pin of the piston section.

* * * * *